US008390685B2

(12) United States Patent
Connell, II

(10) Patent No.: US 8,390,685 B2
(45) Date of Patent: Mar. 5, 2013

(54) VIRTUAL FENCE

(75) Inventor: Jonathan H. Connell, II, Cortlandt-Manor, NY (US)

(73) Assignee: International Business Machines Corporation, Armonk, NY (US)

(*) Notice: Subject to any disclaimer, the term of this patent is extended or adjusted under 35 U.S.C. 154(b) by 1045 days.

(21) Appl. No.: 12/026,698

(22) Filed: Feb. 6, 2008

(65) Prior Publication Data
US 2009/0195654 A1 Aug. 6, 2009

(51) Int. Cl.
H04N 7/18 (2006.01)
(52) U.S. Cl. .......................... 348/154; 348/153; 382/284
(58) Field of Classification Search ............... 348/154
See application file for complete search history.

(56) References Cited

U.S. PATENT DOCUMENTS

| 4,249,207 | A | | 2/1981 | Harman et al. | |
|---|---|---|---|---|---|
| 5,850,352 | A | * | 12/1998 | Moezzi et al. | 345/419 |
| 5,980,123 | A | * | 11/1999 | Heifler | 396/427 |
| 6,674,461 | B1 | * | 1/2004 | Klapman | 348/42 |
| 6,985,212 | B2 | | 1/2006 | Jamieson et al. | |
| 7,019,648 | B2 | | 3/2006 | Gagnon | |
| 7,327,253 | B2 | * | 2/2008 | Whitten et al. | 340/541 |
| 7,791,477 | B2 | * | 9/2010 | Sharma | 340/567 |
| 2001/0033330 | A1 | * | 10/2001 | Garoutte | 348/153 |
| 2003/0004005 | A1 | * | 1/2003 | Ainsworth et al. | 473/151 |
| 2003/0021490 | A1 | * | 1/2003 | Okamoto et al. | 382/284 |
| 2003/0122667 | A1 | * | 7/2003 | Flynn | 340/540 |
| 2003/0123703 | A1 | * | 7/2003 | Pavlidis et al. | 382/103 |
| 2004/0100563 | A1 | * | 5/2004 | Sablak et al. | 348/211.4 |
| 2005/0128291 | A1 | * | 6/2005 | Murakami | 348/143 |
| 2006/0034548 | A1 | * | 2/2006 | Pishdadian et al. | 382/312 |
| 2006/0176167 | A1 | * | 8/2006 | Dohrmann | 340/506 |
| 2007/0052697 | A1 | * | 3/2007 | Cohignac et al. | 345/418 |
| 2007/0127774 | A1 | * | 6/2007 | Zhang et al. | 382/103 |
| 2007/0211145 | A1 | * | 9/2007 | Kilian et al. | 348/148 |
| 2007/0291118 | A1 | * | 12/2007 | Shu et al. | 348/156 |
| 2007/0296815 | A1 | * | 12/2007 | Isaksson et al. | 348/157 |
| 2008/0024605 | A1 | * | 1/2008 | Osann, Jr. | 348/143 |
| 2008/0024610 | A1 | * | 1/2008 | Konishi | 348/159 |
| 2008/0031526 | A1 | * | 2/2008 | Bushell et al. | 382/224 |
| 2008/0231709 | A1 | * | 9/2008 | Brown et al. | 348/169 |
| 2008/0284580 | A1 | * | 11/2008 | Babich et al. | 340/502 |
| 2009/0207046 | A1 | * | 8/2009 | Arrighetti | 340/937 |
| 2010/0231713 | A1 | * | 9/2010 | Oyabu et al. | 348/143 |
| 2010/0259539 | A1 | * | 10/2010 | Papanikolopoulos et al. | 345/420 |

OTHER PUBLICATIONS

Connell et al., "Detection and Tracking in the IBM People Vision System", http://www.research.ibm.com/peoplevision pp. 1-4, Jun. 2004.
Algihah, U.S. Appl. No. 13/688,274, Office Action Communication, END9200740083US2, Jan. 16, 2013, 16 pages.

* cited by examiner

Primary Examiner — Firmin Backer
Assistant Examiner — Hamza Algibhah
(74) Attorney, Agent, or Firm — Matthew Chung Hoffman Warnick LLC

(57) ABSTRACT

The present invention is directed to a virtual fence provided using a plurality of video cameras. A method for providing a virtual fence in accordance with an embodiment includes: positioning a plurality of video cameras about a perimeter to be monitored, the perimeter comprising a plurality of designated areas; for each of the designated areas: capturing video data of the designated area using at least one video camera; analyzing the captured video data to detect an event; and sending at least one of image or video data to a central facility only in response to the detection of the event.

12 Claims, 3 Drawing Sheets

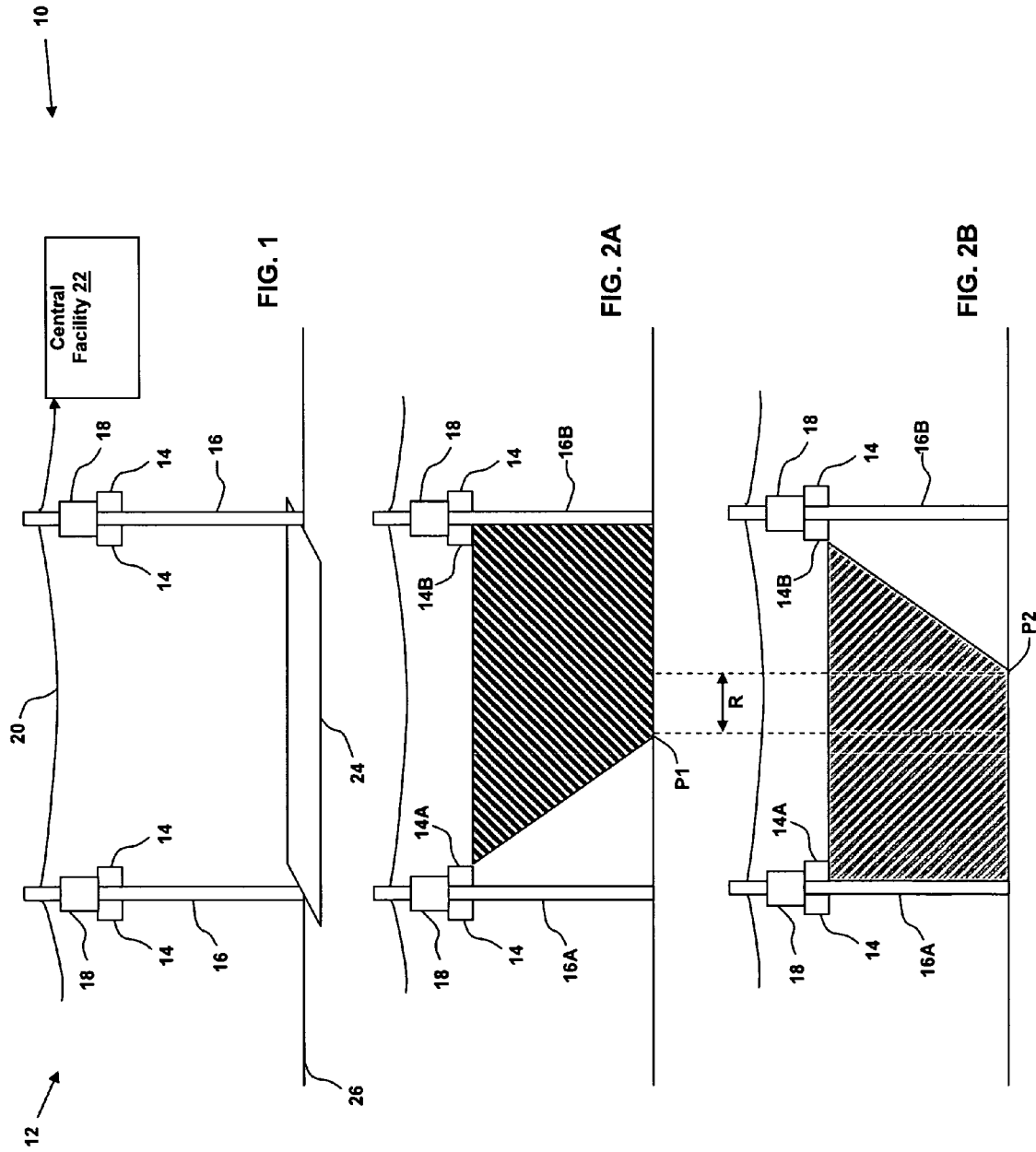

VIRTUAL FENCE

FIELD OF THE INVENTION

The present invention relates to imaging systems, and more specifically relates to a virtual fence provided using a plurality of video cameras.

BACKGROUND OF THE INVENTION

Traditional solutions for monitoring a large perimeter using video surveillance systems and/or the like requires the monitoring of a large number of images feeds. Continuous monitoring of each of the image feeds typically requires numerous personnel, which can be cost prohibitive. To reduce cost, a person may be required to simultaneously monitor a large number of image feeds, making it easier for a person to cross the perimeter undetected. In some cases, a sequence of image feeds, each from a different camera, can be displayed. Again, however, this makes it much easier for a person to cross the perimeter undetected.

Accordingly, there is a need for a solution that addresses these and other deficiencies of the related art.

SUMMARY OF THE INVENTION

The present invention relates to a virtual fence provided using a plurality of video cameras.

A first aspect is directed to a method for providing a virtual fence, comprising: positioning a plurality of video cameras about a perimeter to be monitored, the perimeter comprising a plurality of designated areas; for each of the designated areas: capturing video data of the designated area using at least one video camera; analyzing the captured video data to detect an event; and sending at least one of an alarm, image data, or video data to a central facility only in response to the detection of the event.

A second aspect is directed to a virtual fence, comprising: a plurality of video cameras positioned about a perimeter to be monitored, the perimeter comprising a plurality of designated areas; for each of the designated areas: at least one video camera for capturing video data of the designated area; a system for analyzing the captured video data to detect an event; and a system for sending at least one of an alarm, image data, or video data to a central facility only in response to the detection of the event.

A third aspect is directed to a program product stored on a computer readable medium, which when executed, provides a virtual fence, the computer readable medium comprising program code for: capturing video data using a plurality of video cameras positioned about a perimeter to be monitored; monitoring the video data using background subtraction to detect an event; and sending at least one of an alarm, image data, or video data to a central facility only in response to the detection of the event.

A fourth aspect is directed to a method for deploying an application for providing a virtual fence, comprising: providing a computer infrastructure being operable to: capture video data using a plurality of video cameras positioned about a perimeter to be monitored; monitor the video data using background subtraction to detect an event; and send at least one of an alarm, image data, or video data to a central facility only in response to the detection of the event.

The illustrative aspects of the present invention are designed to solve the problems herein described and other problems not discussed.

BRIEF DESCRIPTION OF THE DRAWINGS

These and other features of the present invention will be more readily understood from the following detailed description taken in conjunction with the accompanying drawings.

FIG. 1 depicts an illustrative system for providing a virtual fence in accordance with an embodiment of the present invention.

FIGS. 2A and 2B depict an example of the coverage that can be provided by a pair of video cameras of the virtual fence of FIG. 1 in accordance with an embodiment of the present invention.

Figure 4:
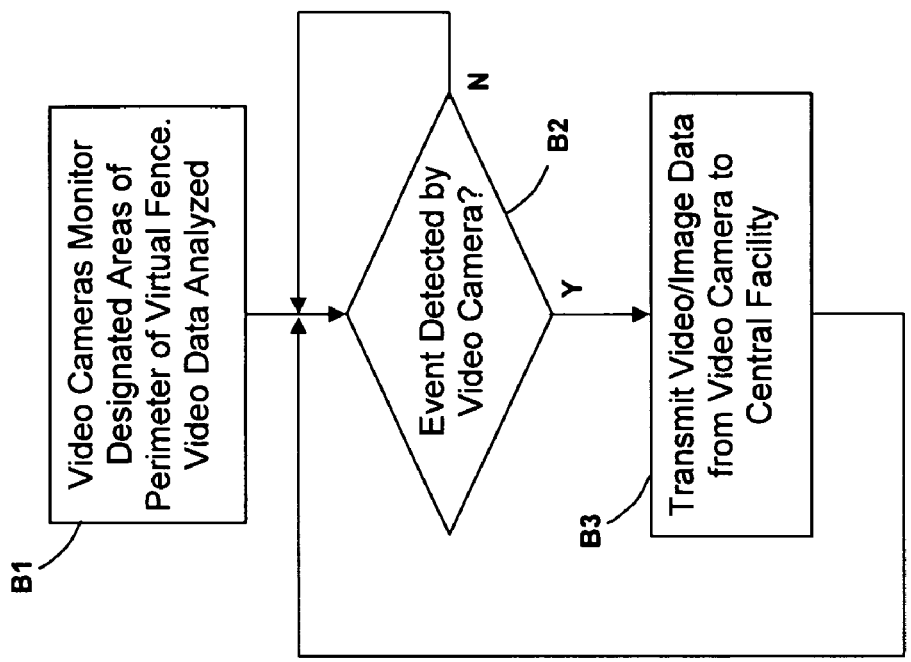
FIG. 4 depicts a flow diagram of an operation of a virtual fence in accordance with an embodiment of the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As detailed above, the disclosure relates to a virtual fence provided using a plurality of video cameras.

FIG. 1 depicts an illustrative system 10 for providing a virtual fence 12 using a plurality of video cameras 14 in accordance with an embodiment of the present invention. The system 10 employs a computer vision technique called background subtraction (BGS) in a novel fashion to create the virtual fence 12. BGS is used to identify moving objects in a video image that differ significantly from a background. In general, BGS compares a current video image against a reference image of a stationary environment to detect regions of change. Such differences generally correspond to moving foreground objects of interest. Any suitable now known or later developed BGS technique can be used in the practice of the present invention. In accordance with the present invention, BGS is also intended to cover the case where the reference comparison frame is simply the previous video frame (i.e., frame differencing). Although described in association with BGS, it will be apparent that other event detection (e.g., moving object detection) techniques can also be used in the practice of the present invention.

The system 10 comprises a series of poles 16. Each pole 16 includes at least one video camera 14, directed toward a next (or previous) pole 16, and a processing unit 18. Each video camera 14 is mounted on a pole 16 such that a next (or previous) pole 16 is within a field of view of the video camera 14. In the present invention, a pole 16 comprises any type of supporting structure (e.g., telephone pole) capable of supporting at least one video camera 14.

The video camera(s) 14 and processing unit 18 on each pole 16 are coupled via a communication link 20 to a central facility 22. The processing unit 18 can be mounted to the pole 16, can be buried in the ground near the pole 16, or positioned in any suitable location. In another embodiment, the processing unit 18 is not co-located with the video camera(s) 14 and/or pole 16. For example, the processing unit 18 can be provided at a remote location (e.g., at the central facility 22) that is in communication with the video camera(s) 14.

The system 10 is configured to use BGS in a narrow strip 24 between each pair of poles 16, on at least one side of a line between the poles 16. The series of poles 16 can be arranged in a line (e.g., such as on the border between two countries, on a bridge, etc.), in a circle (e.g., around a building, structure, airfield, etc.), and/or in any desired arrangement.

The video from each video camera 14 on a pole 16 is provided to the processing unit 18 on (or associated with) the pole 16, which continuously performs BGS (or other suitable moving object detection) on the video data. Real ground size estimates can be computed by the processing unit 18 to prevent triggering on objects (e.g., animals) smaller than a predetermined size, while still detecting humans. When an event (e.g., object, motion, motion in a particular direction, and/or other preset conditions) is detected via BGS, the relevant processing unit(s) 18 signals the central facility 22 (e.g., an alarm signal) and/or transmits a still image, live video, and/or a video clip captured by the relevant video camera(s) 14 to the central facility 22. The processing unit 18 can also detect when the track of an object crosses a specified line segment (in any direction and/or in one or more specified directions (e.g., left-to-right, right-to-left, etc)) rather than (or in addition to) when an object itself interrupts the line segment. Such tracking can be provided by the processing unit 18 by linking each object detected in one image frame to the corresponding object detected in a second image frame, thereby generating a motion track connecting the object positions. This provides for the detection of objects that move rapidly relative to the frame rate of the video camera(s) 14 (e.g., that appear to jump form the left of the fence to the right).

The communication link 20 for transmitting video, images, and/or other data, to the central facility 22 can comprise a fiber optic line, a wireless data link, and/or the like. The communication link 20 can also be used to transmit data from the central facility 22 to each processing unit 18. Power can be supplied to the video camera(s) 14 and the processing unit 18 on each pole 16 using copper wires (not shown), via a solar panel affixed to the each pole 16, and/or using any other solution.

One technique for providing real ground size estimates is to assume a flat ground plane. The lowest point of a detected object is assumed to be indicative of its position on the ground. Trigonometric relations concerning the height, downward tip, focal length, etc., of the video camera(s) 14, and the pixel height of the detected object can then be used to estimate the real world size of the detected object.

The system 10 places more autonomy at the video cameras 14 (and associated processing units 18) than conventional video surveillance systems. Transmission of alarm signals, video, images, and/or other data to the central facility 22 takes place only when it is determined that an event has occurred. This can reduce cabling and network bandwidth requirements as well as the physical size and power consumption of the central facility 22.

In an illustrative implementation, the video cameras 14 on two consecutive poles 16 start ground coverage less than 50% of the way out from their respective poles 16, such that there is an overlap of coverage. For instance, as depicted in FIG. 2A, the video camera 14A on the pole 16A is directed toward the pole 16B and starts its coverage at a point P1 that is about 40% of the way out from the pole 16A. Similarly, as depicted in FIG. 2B, the video camera 14B on the pole 16B is directed toward the pole 16A and starts its coverage at a point P2 that is about 40% of the way out from the pole 16B. This gives an object size change factor of 2.5×, and there is a 20% overlap region R between the poles 16A, 16B that is monitored by both of the video cameras 14A, 14B.

The ground coverage of the video cameras 14A, 14B can start at other points relative to the respective poles 16A, 16B. For example, point P1 can be about 30% of the way out from the pole 16A, and point P2 can be about 30% of the way out from the pole 16B, thereby providing a 40% overlap region R between the poles 16A, 16B. Further, P1 and P2 need not be the same for each of the video cameras 14A, 14B. For instance, point P1 can be about 30% of the way out from the pole 16A, while point P2 can be about 40% of the way out from the pole 16B, thereby providing a 30% overlap region R between the poles 16A, 16B. The spacing of the poles 16A, 16B can also be adjusted to vary to size of the overlap region R. For example, the spacing of the poles 16A, 16B can be reduced to provide up to a 100% overlap region R, thus allowing one of the video cameras 14A, 14B to fail without any compromise in the detection ability of the virtual fence 12. Although not optimal in terms of ground coverage and effectiveness, the video cameras 14A, 14B, and poles 16A, 16B can be configured such that there is no overlap region R between the poles 16A, 16B.

The spacing between the poles 16 can be governed, for example, by the smallest object that is to be detected and the focal length of the video camera 14, among other factors. For night operation in very dark environments (e.g., in the desert), the spacing of the poles 16 can be limited by the effective range of the illumination that can be provided.

An illustrative spacing can be about 450 feet (150 yards), which calls for twelve poles 16 and a total of twenty-four video cameras 14 per mile. Using, for example, a video camera 14 having a 50 mm lens with a ⅓ inch imager of about 6.4 mm×4.8 mm, this provides a coverage of 58×43 feet at 450 feet. This means that one pixel is about 1 inch square, so a human would show up as 8 to 16 pixels wide (in VGA resolution). A lower resolution would also be sufficient (e.g., 2" pixels).

Assuming a mounting height of 20 feet for each video camera 14, the video camera 14 would require a field of view of 6.35 degrees to cover the full 20 feet of height at a standoff range of 180 feet (i.e., 450 feet×40%), which falls within the 7.32 degree horizontal field of view provided by a 50 mm lens.

Assuming a video processing speed of 30 fps, even relatively fast objects (and/or the track thereof) can be detected. For instance, assume a motorcycle is traveling at 120 mph halfway between a pair of the poles 16. Using the geometry and imaging parameters postulated above, at this position the width of the imaged area is only 22 feet. Since the motorcycle is going 176 feet-per-second, it will cross the imaged area in about ⅛ of a second. To this extent, there will be at least 4 frames containing the motorcycle, thereby allowing its track to be detected.

Figure 3:
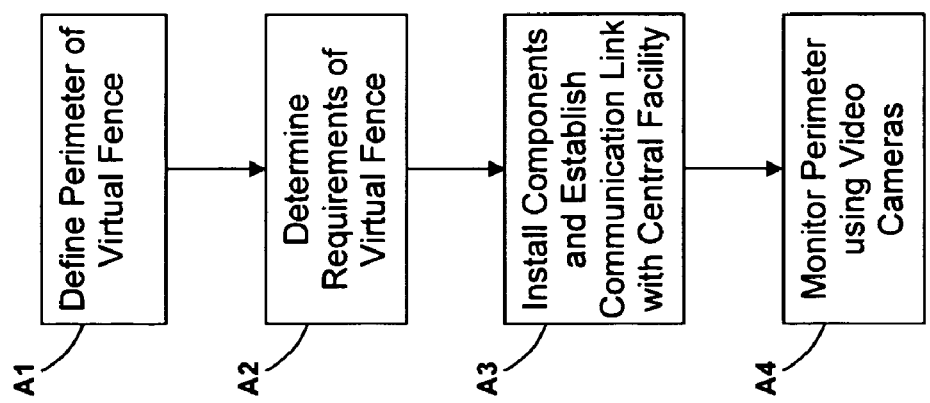
FIG. 3 depicts a flow diagram of an illustrative process for providing a virtual fence in accordance with an embodiment of the present invention.

FIG. 3 depicts a flow diagram of an illustrative process for providing a virtual fence in accordance with an embodiment of the present invention.

At A1, the perimeter of the virtual fence is defined. At A2, the number and spacing of poles, configuration of video cameras, processing requirements, power requirements, etc., required to provide a desired coverage are determined. At A3, the poles, video cameras, processing units, etc. are installed and a communication link to a central facility is established. At A4, the perimeter established in A1 is monitored for events using the video data captured by the video cameras, which is analyzed using BGS by the respective processing units.

FIG. 4 depicts a flow diagram of an operation of a virtual fence in accordance with an embodiment of the present invention. In B1, each video camera captures video data of its designated area of the perimeter of the virtual fence, and the captured video data is analyzed by a respective processing unit. This continues (NO, B2), until an event is detected (YES, B2). If an event is detected (YES, B2), the processing unit that detected the event transmits an alarm and/or video/image data from the relevant video camera to a central facility in B3. To this extent, the alarm and/or video/image data is transmitted to the central facility only in response to the detection of an event. Flow then passes back to B2, where the monitoring of the perimeter of the virtual fence continues.

Figure 5:
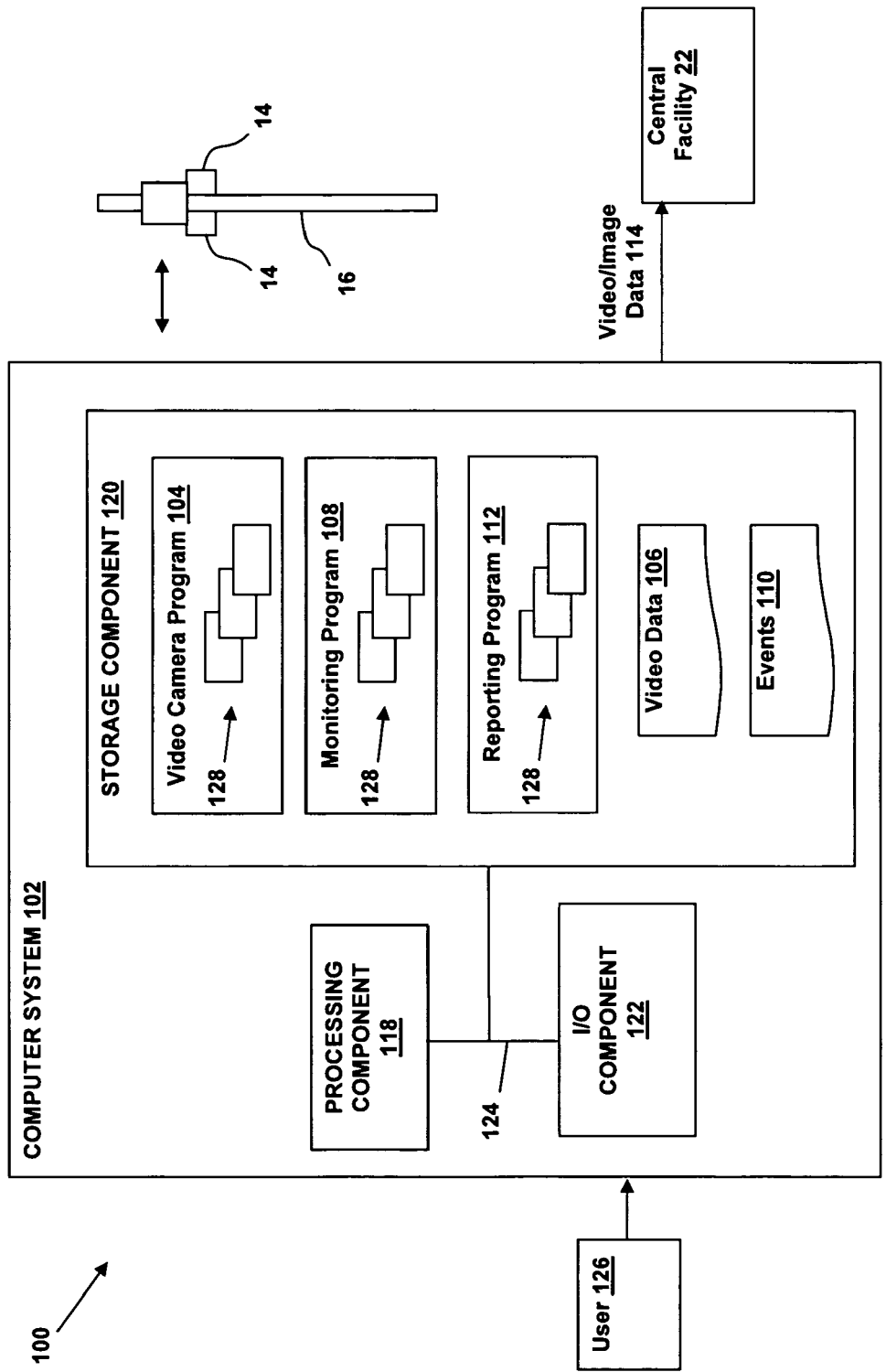
FIG. 5 depicts an illustrative environment for implementing embodiment(s) of the present invention.

FIG. 5 shows an illustrative environment 100 for providing at least a portion of a virtual fence in accordance with any/all embodiments of the disclosure. To this extent, environment 100 includes a computer system 102 that can perform the processes described herein (e.g., the computer system 102 can be configured to perform the functions of the processing unit 18 (FIG. 1). For example, the computer system 102 can be configured to include a video camera program 104 for controlling the operation of a plurality of video cameras 14 (e.g., a pair of video cameras 14 on a pole 16) to obtain video data 106, a monitoring program 108 for analyzing the video data 106 in order to detect event(s) 110 (e.g., using BGS), and a reporting program 112 for transmitting an alarm and/or video/image data 114 to a central facility 22 in response to the detection of an event 110, by performing the processes described herein.

The computer system 102 is shown including a processing component 118 (e.g., one or more processors), a storage component 120 (e.g., a storage hierarchy), an input/output (I/O) component 122 (e.g., one or more I/O interfaces and/or devices), and a communications pathway 124. In general, the processing component 118 executes program code, such as video camera program 104, monitoring program 108, and reporting program 112, which are at least partially stored in storage component 120. While executing program code, the processing component 118 can read and/or write data to/from the storage component 120 and/or the I/O component 122. The communication pathway 124 provides a communications link between each of the components in computer system 102. The I/O component 122 can comprise one or more human I/O devices, which enable a human user 126 to interact with the computer system 102, and/or one or more communications devices to enable other computer system(s) to communicate with the computer system 102 using any type of communications link.

The computer system 102 can comprise one or more general purpose computing articles of manufacture (e.g., computing devices) capable of executing program code installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. To this extent, the video camera program 104, monitoring program 108, and/or reporting program 112 can be embodied as any combination of system software and/or application software. Further, the video camera program 104, monitoring program 108, and/or reporting program 112 can be implemented using a set of modules 128. In this case, a module 128 can comprise a component that performs a set of actions used by the video camera program 104, monitoring program 108, and/or reporting program 112. Further, it is understood that some of the actions discussed herein may not be implemented or additional actions may be implemented by computer system 102.

When the computer system 102 comprises multiple computing devices, each computing device can have only a portion of video camera program 104, monitoring program 108, and/or reporting program 112 installed thereon (e.g., one or more modules 128). However, it is understood that the computer system 102 is only representative of various possible equivalent computer systems that may implement the process described herein. To this extent, in other embodiments, the actions implemented by the computer system 102 can be at least partially implemented by one or more computing devices that include any combination of general and/or specific purpose hardware and/or program code. In each embodiment, the program code and hardware can be provided using standard programming and engineering techniques, respectively.

When the computer system 102 includes multiple computing devices, the computing devices can communicate over any type of communications link. Further, while performing the process described herein, the computer system 102 can communicate with one or more other computer systems using any type of communications link. In either case, the communications link can comprise any combination of various types of wired and/or wireless links; comprise any combination of one or more types of networks; and/or utilize any combination of various types of transmission techniques and protocols.

It is understood that each of the process flows shown and described herein is only illustrative. To this extent, numerous variations of these process flows are possible, and are included within the scope of this disclosure. Illustrative variations include performing one or more processes in parallel and/or a different order, performing additional processes, not performing some processes, and/or the like. To this extent, the computer system 102, video camera program 104, monitoring program 108, and/or reporting program 112 can utilize multiple tasks/threads/processes to perform the actions of the processes described herein.

It is further understood that aspects of the invention further provide various alternative embodiments. For example, in one embodiment, the invention provides a computer program stored on at least one computer-readable medium, which when executed, enables a computer system to perform the processes described above. To this extent, the computer-readable medium can include program code, such as the video camera program 104, monitoring program 108, and/or reporting program 112, which implement some or all of the process described herein. It is understood that the term "computer-readable medium" comprises one or more of any type of tangible medium of expression capable of embodying a copy of the program code (e.g., a physical embodiment). For example, the computer-readable medium can comprise: one or more portable storage articles of manufacture; one or more memory/storage components of a computing device; a modulated data signal having one or more of its characteristics set and/or changed in such a manner as to encode information in the signal; paper; and/or the like.

In another embodiment, a computer system, such as the computer system 102, can be obtained (e.g., provided, created, maintained, made available, etc.) and one or more programs/systems for performing the process described herein can be obtained (e.g., provided, created, purchased, used, modified, etc.) and deployed to the computer system. To this extent, the deployment can comprise one or more of: (1) installing program code on a computing device from a computer-readable medium; (2) adding one or more computing devices to the computer system; and (3) incorporating and/or modifying the computer system to enable it to perform the process described herein.

Aspects of the invention can be also implemented as part of a business method that performs the process described herein on a subscription, advertising, and/or fee basis. That is, a service provider could offer to provide some/all of the components/processes needed to provide a virtual fence, as described herein. In this case, the service provider can manage (e.g., create, maintain, support, etc.) some or all of the environment 100, such as the computer system 102, that performs the process described herein for one or more customers. In return, the service provider can receive payment from the customer(s) under a subscription and/or fee agreement, receive payment from the sale of advertising to one or more third parties, and/or the like.

The foregoing description of the preferred embodiments of this invention has been presented for purposes of illustration and description. It is not intended to be exhaustive or to limit the invention to the precise form disclosed, and obviously, many modifications and variations are possible.

What is claimed is:

1. A method for providing a virtual fence, comprising:
   positioning a plurality of video cameras about a perimeter to be monitored, the perimeter comprising a plurality of designated areas and completely encircling an area, wherein positioning a plurality of video cameras comprises:
      providing a series of poles about the perimeter to be monitored, wherein each designated area comprises an area between a respective pair of the poles;
      mounting a pair of video cameras on each of the poles, wherein a first of each pair of video cameras mounted on each pole is directed toward a previous pole in the series of poles, and a second of each pair of video cameras mounted on each pole is directed toward a next pole in the series of poles, such that an overlap in coverage between the video data of the first and second video cameras of each pair of video cameras is provided in each designated area;
   for each of the designated areas:
      capturing video data in a thin strip in the designated area using a pair of the video cameras on two adjacent poles;
      analyzing the captured video data to detect an event; and
      sending at least one of an alarm, image data, or video data to a central facility only in response to the detection of the event.

2. The method of claim 1, wherein analyzing the captured video data to detect an event further comprises:
   performing moving object detection on the captured video data.

3. The method of claim 2, wherein detecting an event further comprises:
   detecting when a track of an object crosses into or out of the encircled area of the perimeter via the designated area.

4. The method of claim 2, wherein detecting an event further comprises:
   detecting a size of an object crossing the designated area; and
   limiting the detection of an event to an object having at least a predetermined size.

5. The method of claim 1, further comprising:
   associating a processing unit with each pole for analyzing the captured video.

6. A virtual fence, comprising:
   a plurality of video cameras positioned about a perimeter to be monitored, the perimeter comprising a plurality of designated areas and completely encircling an area, wherein the plurality of video cameras are positioned on a series of poles about the perimeter to be monitored, wherein each designated area comprises an area between a respective pair of the poles, wherein a pair of video cameras are mounted on each of the poles, wherein a first of each pair of video cameras mounted on each pole is directed toward a previous pole in the series of poles, and a second of each pair of video cameras mounted on each pole is directed toward a next pole in the series of poles, such that an overlap in coverage between the video data of the first and second video cameras of each pair of video cameras is provided in each designated area;
   for each of the designated areas:
      a pair of the video camera cameras on two adjacent poles for capturing video data in a thin strip in the designated area;
      a system for analyzing the captured video data to detect an event; and
      a system for sending at least one of an alarm, image data, or video data to a central facility only in response to the detection of the event.

7. The virtual fence of claim 6, wherein the system for analyzing the captured video data to detect an event further comprises:
   a system for performing moving object detection on the captured video data.

8. The virtual fence of claim 7, wherein the system for analyzing the captured video data to detect an event further comprises:
   a system for detecting when a track of an object crosses into or out of the encircled area of the perimeter via the designated area.

9. The virtual fence of claim 7, wherein the system for analyzing the captured video data to detect an event further comprises:
   a system for detecting a size of an object crossing the designated area; and
   a system for limiting the detection of an event to an object having at least a predetermined size.

10. The virtual fence of claim 6, further comprising:
    a processing unit associated with each pole for analyzing the captured video.

11. A program product stored on a non-transitory computer readable medium, which when executed, provides a virtual fence, the computer readable medium comprising program code for:
    capturing video data using a plurality of video cameras positioned about a perimeter to be monitored, the perimeter comprising a plurality of designated areas and completely encircling an area, wherein a series of poles are provided about the perimeter to be monitored, wherein each designated area comprises an area between a respective pair of the poles, wherein a pair of video cameras are mounted on each of the poles, wherein a first of each pair of video cameras mounted on each pole is directed toward a previous pole in the series of poles, and a second of each pair of video cameras mounted on each pole is directed toward a next pole in the series of poles, such that an overlap in coverage between the video data of the first and second video cameras of each pair of video cameras is provided in each designated area;

monitoring the video data using background subtraction in a thin strip in each designated area to detect an event; and sending at least one of an alarm, image data, or video data to a central facility only in response to the detection of the event.

12. A method for deploying an application for providing a virtual fence, comprising:

providing a computer infrastructure being operable to:

capture video data using a plurality of video cameras positioned about a perimeter to be monitored, the perimeter comprising a plurality of designated areas and completely encircling an area, wherein a series of poles are provided about the perimeter to be monitored, wherein each designated area comprises an area between a respective pair of the poles, wherein a pair of video cameras are mounted on each of the poles, wherein a first of each pair of video cameras mounted on each pole is directed toward a previous pole in the series of poles, and a second of each pair of video cameras mounted on each pole is directed toward a next pole in the series of poles, such that an overlap in coverage between the video data of the first and second video cameras of each pair of video cameras is provided in each designated area;

monitor the video data using background subtraction in a thin strip in each designated area to detect an event; and send at least one of an alarm, image data, or video data to a central facility only in response to the detection of the event.

* * * * *